Figure 1:
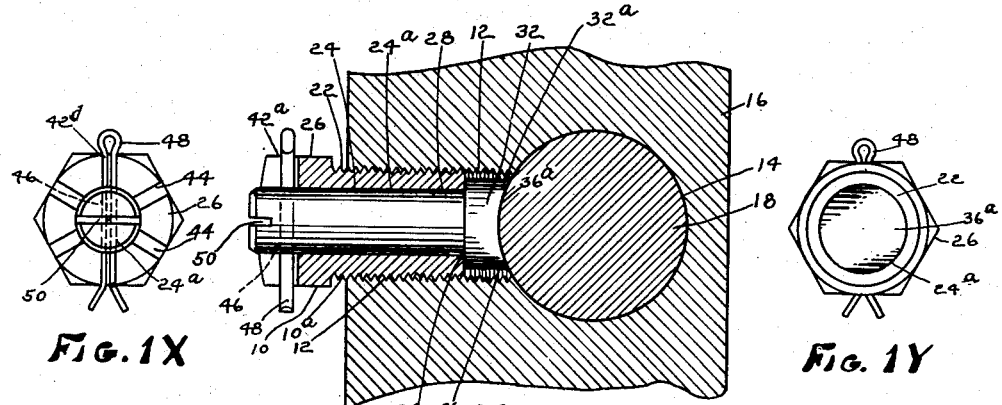
Figure 1X:
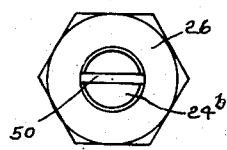

Aug. 15, 1944. H. G. BEEDE 2,355,899

LOCKING SET SCREW

Filed Dec. 4, 1940

INVENTOR
HERBERT G. BEEDE

BY Thomas A. Jenckes
ATTORNEY

Patented Aug. 15, 1944

2,355,899

UNITED STATES PATENT OFFICE 2,355,899

LOCKING SETSCREW

Herbert G. Beede, Pawtucket, R. I., assignor to Pantex Pressing Machine, Inc., Central Falls, R. I., a corporation of Delaware Application December 4, 1940, Serial No. 368,414

10 Claims. (Cl. 151—32)

My invention relates to improvements in set screws.

While I am aware that others have attempted to provide means for locking set screws in a set position engaging the member to be locked, so far as I am aware these have been rather complicated structures which have been hard to lock in such a position.

An object of my invention, therefore, is to provide a simple structure composed of a minimum number of parts which may be locked together to lock one member to another member, preferably with a positive lock. So far as I am aware, none of the prior art structures have provided a positive lock for a set screw having all of its component parts in the set screw structure itself.

An object of my invention, therefore, is to provide a set screw for insertion within a threaded set screw hole in a first member extending to a second member movable relative to said first member which may be positively and readily locked by a simple relative locking movement preferably at the outer end of the set screw. For this purpose I preferably employ a hollow bolt member which generally is similar to the standard type of set screw but which has a smooth circular bore and a turning head and a stem member extending through said bore having means on the end thereof for non-rotatable engagement with said second member and means to positively lock said bolt member to said stem member with the end portion thereof non-rotatably engaging the relatively movable second member in the desired manner. Various embodiments of my invention are shown in this application, others being shown in a companion application of mine for a Locking wedge point set screw employing additional features, S. N. 368,884 filed December 6, 1940, and a companion joint application of myself and Nicholas Monsarrat for Locking adjusting point set screw, S. N. 369,000 filed December 7, 1940, also employing additional features.

A further object of my invention is to provide a locking set screw wherein the locking means may be readily accessible externally and is preferably on the outer end of the set screw itself and which is so concealed within the set screw structure so as to be substantially unnoticeable in the external appearance of the set screw.

A further object of my improved set screw is to provide means in the set screw structure itself to permit proper alignment of the parts thereof prior to locking.

Further features of my invention relate to various modifications of the improved set screw I may employ either in the locking means therefor or the locking point thereof.

These and such other objects of my invention as may hereinafter appear will be best understood from a description of the accompanying drawing which illustrates various embodiments thereof, various embodiments thereof also being shown in said companion applications.

In the drawing, Fig. 1 is a sectional view of one modification of my locking set screw, having an end portion adapted to frictionally engage and retain a shaft or second member in the desired position in a recess therefor in a retaining or first member, showing the shaft and retaining member in cross-section, the bolt member of my improved set screw in axial section and the stem member and locking pin in elevation and illustrating a preferred type of locking means.

Fig. 1$^x$ is a plan view of the first modification of locking set screw.

Fig. 1$^y$ is a reverse plan view of the first modification of locking set screw.

Figure 2X:
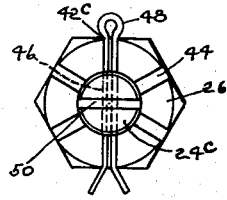
Figure 2:
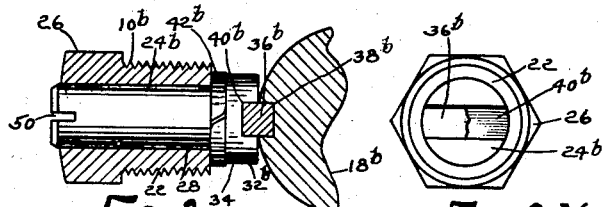
Figure 1Y:
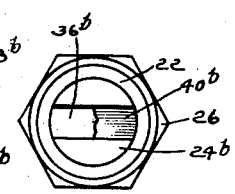
Figure 2Y:
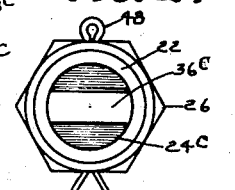

Fig. 2 is a sectional view similar to Fig. 1 with the retaining member omitted of a second modification of my invention, the end portion of the stem member having a projection adapted to mate with a preformed recess in the second member and having a different type of locking means.

Fig. 2$^x$ is a plan view of the second modification of locking set screw.

Fig. 2$^y$ is a reverse plan view of the second modification of locking set screw.

Figure 3X:
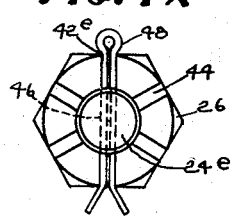
Figure 3:
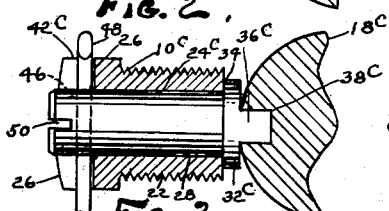
Figure 3Y:
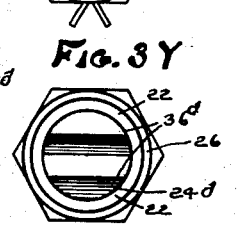

Fig. 3 is a sectional view similar to Fig. 1 of a third embodiment of my invention with the retaining member omitted, showing the mating projection integral with the stem member and employing my preferred type of locking means.

Fig. 3$^x$ is a plan view of the third embodiment of locking set screw.

Fig. 3$^y$ is a reverse plan view of the third embodiment of locking set screw.

Figures 4, 4X, 4Y:
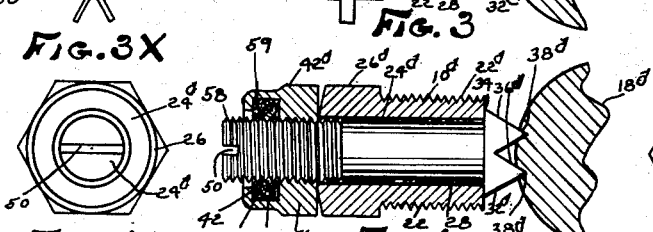

Fig. 4 is a sectional view similar to Fig. 1 of a fourth embodiment of my invention with the retaining member omitted, having an end portion in the form of a projection adapted to positively bite into the shaft or second member and form its cooperating locking recess, and with another embodiment of locking means.

Fig. 4$^x$ is a plan view of the fourth embodiment of locking set screw.

Fig. 4ʸ is a reverse plan view of the fourth embodiment of locking set screw.

Figures 5, 5X:
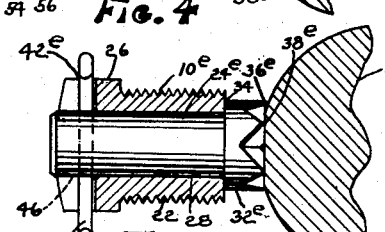
Figure 5Y:
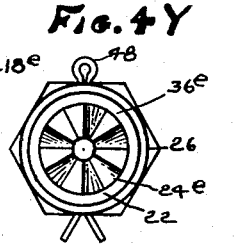

Fig. 5 is a sectional view similar to Fig. 1 of a fifth embodiment of my invention with the movable member omitted, having a different embodiment of a point in the form of a projection adapted to positively bite into the movable member and form its cooperating locking recess.

Fig. 5ˣ is a plan view of the fifth embodiment of locking set screw.

Fig. 5ʸ is a reverse plan view of the fifth embodiment of locking set screw.

In the drawing, like characters of reference indicate like parts throughout, 10 indicates a locking set screw constructed in accordance with my invention. In the broader aspects of my invention, as stated, it comprises a set screw 10 adapted for insertion within a threaded set screw hole 12 in a first or retaining member 16 extending to a second member movable relative to said first member. While my improved type of set screw 10 may be employed for locking any type of a relatively movable second member 18 in adjusted position in a movable member retaining recess 14 in a retaining or first member 16, I have illustrated it in the drawing as employed to lock a movable member comprising a shaft or second member 18 in a bore 14 in a housing or first member 16 and the set screw 10 suitably inserted within a threaded set screw hole 12 in said housing or first member 16 radial to said shaft or second member 18. In the broader aspects of my invention it includes an externally threaded shank or bolt member 22 for insertion within the threaded hole 12 of the general usual configuration of a set screw shank, means 24 movable relative thereto for non-rotatably engaging said relatively movable second member 18 in said retaining member recess 14 to restrict relative movement between said second movable member 18 and retaining first member 16, and means accessible from exterior of said set screw in inserted position, which means may be on the outer end of said set screw preferably on the set screw head 26, operative to lock said movable means 24 in position non-rotatably engaging said movable member 18. In all embodiments of my invention shown, the shank 22 comprises the usual bolt member 22 of a set screw provided, however, with a hollow smooth circular axial bore 28 and with a standard type of turning head 26. As the means movable relative to said threaded shank member 22 I provide an inner locking stem member 24 extending through said hollow bolt member bore 28 and having an end portion 32 having an upper portion 34 of greater area than said bolt member bore 28 below the threaded end of said bolt member to positively limit the axial upward movement of said stem member 24 relative to said bolt member 22, and having means 36 on the lower end thereof for non-rotatably engaging said movable member 18 in said retaining member recess 14 to restrain relative movement between said movable and retaining members. I also employ means 42 for locking said bolt member 22 to said stem member 24 with the means 36 on the end portion 32 of said stem member non-rotatably engaging said movable second member 18 in the desired adjusted manner.

Any suitable means 36 on the lower end of said end portion 32 for non-rotatably engaging said movable second member to restrain relative movement between said movable second and retaining first members may be employed, and I have shown in the drawing three general types of such means, namely (1) means on said end portion shaped to frictionally non-rotatably engage said movable member as of the embodiment of Fig. 1; (2) means on said end portion to positively mate with preformed means on said movable second member as of the embodiments of Figs. 2 and 3; (3) a projecting means on said end portion adapted to positively bite into said movable second member to form its complementally shaped interlocking portion thereon while being inserted as shown in the embodiments of Figs. 4 and 5.

In the embodiment of my invention shown in Fig. 1 illustrating the aforesaid friction principle (1), I have shaped said portion 36ᵃ of said end portion 32 of a transversely concave shape of a curvature generally similar to that of the shaft 18 to positively engage said shaft 18 to hold it in the desired adjusted position in said retaining member 16 and at the same time to render the stem 24 non-rotatable. In the embodiment shown in Fig. 2 I have shown the end portion 36ᵇ as comprising an intermediate key member which may be selectively inserted as a key in a preformed axial keyway or spline 38ᵇ in the shaft 18ᵇ and in a transverse channel 40ᵇ extending diametrically on the inner end of the cylindrical end portion 32ᵇ. Thus, if the key 36ᵇ be initially permanently secured within the transverse channel 40ᵇ, it will become mated with its cooperating recess 38ᵇ, in this instance the axial spline 38ᵇ as the set screw 10ᵇ is inserted. If desired, however, the key 36ᵇ may be permanently fitted into the spline 38ᵇ to fit into the channel 40ᵇ on insertion of the set screw. If desired, as shown in Fig. 3, however, the key 36ᶜ may be integral with the inner end of said end portion 32ᶜ to fit in a suitable axial spline 38ᶜ in the shaft 18ᶜ, as in the embodiment shown in Fig. 2. It is thus obvious that both Figs. 2 and 3 are illustrative of the preshaped generic species 2 heretofore referred to. As stated previously, I may, if desired, as described in reference to species 3, form the engaging means 36 on the end portion in the form of a projection adapted to cut its own cooperating locking depression in the shaft 18 while being inserted, and in the embodiment of my invention shown in Fig. 4 I have shown said means constructed in the form of two transverse chisel points 36ᵈ adapted to cut their own recesses 38ᵈ in the shaft 18ᵈ, and in the embodiment of my invention shown in Fig. 5, I have shown said means 36ᵉ shaped in the form of radial teeth adapted to cut cooperating locking deformations 38ᵉ in the shaft 18ᵉ.

As stated hitherto, any suitable type of means may be provided for locking, preferably positively, the rotatable inner stem member 24 to said outer hollow bolt member 22 with the means 36 thereof non-rotatably engaging said movable member in the desired adjusted manner. I have shown my preferred type of such means 42ᵃ in Fig. 1, and for this purpose I preferably provide a plurality of diametric slits 44 in the upper surface of the turning head 26 of the bolt member 22 and I preferably provide a diametric hole 46 adjacent the outer end of said stem member 24. After the shaped engaging means 36ᵃ of the end portion 32ᵃ of the stem member has engaged the shaft 18, a cotter pin 48, may be inserted through the most adjacent diametric slit 44 in the turning head 26 and the diametric hole 46 in said stem member for this purpose aligned therewith. For the purpose of relatively turning the stem member 24 to said bolt member 22, the outer end of the stem member may be provided with suitable means for turning it, such as the kerf 50 to receive the end of a screw driver therein. If desired, however, an external head of any standard type known in the art may be employed. In place of the preferred type of locking means 42ª, any suitable type of locking means may be employed, such as the split lock washer 42ᵇ of standard construction shown in Fig. 2, which may be inserted axially between portions of said stem member 24ᵇ and bolt member 22, between the large upper portion 34 of the end portion 32ᵇ and the lower end of the bolt member, or as shown in said application No. 368,884.

I have shown in Fig. 4 a still further embodiment of locking means comprising an elastic check or lock nut of a type which has recently come on the market, which comprises an annular unthreaded fiber insert 52 contained within a suitable recess 54 in the end of the lock nut 56 of such diameter that when the lock nut 56 is threaded onto the upper threaded stem end 58, the threads thereof will frictionally cut cooperating threads 59 on the internal periphery of said fiber insert or washer 52 to resiliently lock the nut 56 to said stem member 24, the lock nut 56 in turn abutting the turning head 26 of the bolt member to lock the stem member 24 to the bolt member 22.

As stated, still further embodiments of my present invention are shown in said companion applications and many other modifications of the locking points, locking means or other portions thereof may be made without departing from the spirit of my invention.

To employ my improved set screw it is merely necessary to screw the set screw 10 within the recess 12 until the engaging means 36 on the end thereof firmly non-rotatably abuts the desired portion of the movable member 18, whether said engaging means comprises the frictional engaging concave portion 36ª, the pointed projections 36ᵇ or 36ᶜ, or the pointed portions 36ᵈ or 36ᵉ. The kerf 50 in the outer end of the stem member 24 may be employed to rotate the stem member 24 within the hollow bolt 22 to accurately align the engaging means 36 on the end portion thereof into the desired actual contact with the shaft. The head 26 may be further turned until a selected channel 44 in said turning head 26 of the bolt member 22 is brought into alignment with the diametric hole 46 in the stem. To lock, the cotter pin 48 is inserted through said aligned channel 44 and diametric hole 46 to permanently lock the set screw in the desired adjusted position, with the engaging means thereof non-rotatably engaging said movable member in the desired adjusted manner. To remove the set screw employing my improved embodiment with the cotter pin 48, as shown in Figs. 1, 3 and 5, the pin 48 is first removed and the turning head 26 turned and the shaped engaging means 36 readily withdrawn from cooperation with its contacting shaft portion. In the embodiment of Fig. 2, the lock washer 42ᵇ automatically becomes unlocked as the turning head 26 is turned. In the embodiment of Fig. 4, the lock nut 56 first has to be released before the turning head 26 can be turned to remove the engaging portion 36ᵈ of the stem from the deformed portion 38ᵈ of the shaft 18ᵈ. The lock nut 56 will have to be unscrewed sufficiently to permit the withdrawal of the pointed end 36ᵈ of the stem member 24ᵈ from its cooperating deformed shaft portion 38ᵈ when the entire device may be removed by merely conjointly rotating the lock nut 56 and the turning head 26 of the bolt member 22.

What I claim is:

1. A set screw for insertion within a threaded set screw hole in a first member extending to a second member movable relative to said first member, comprising a threaded bolt member having a smooth circular bore and turning means, a smooth stem member extending through said bore having an end portion of greater area than said bore beyond the threaded end of said bolt member having means on said end portion for non-rotatable engagement with said second member to restrain relative movement between said first and second members and means for locking said bolt member to said stem member against relative rotative movement with said means on said end portion of said stem member engaging said second member in the desired position.

2. A set screw for insertion within a threaded set screw hole in a first member extending to a second shaft member movable relative to said first member comprising a threaded bolt member having a smooth circular bore and turning means, a smooth stem member extending through said bore having an end portion of greater area than said bore beyond the threaded end of said bolt member having an end having a partially cylindrical concave surface of substantially the radius of said movable second member to frictionally grip said second shaft member to prevent relative movement between said first and second members, and means for locking said bolt member to said stem member against relative rotative movement with said concave surface of said stem member non-rotatably engaging said shaft member.

3. A set screw for insertion within a threaded set screw hole in a first member extending to a second member movable relative to said first member comprising a threaded bolt member having a smooth circular bore and turning means, a smooth stem member extending through said bore having an end portion of greater area than said bore beyond the threaded end of said bolt member having engaging means on the end thereof shaped to positively interlock with complementary shaped engaging means on said second member to positively prevent relatively movement between said first and second members, and means for locking said bolt member to said stem member against relative rotative movement with said positively interlocking means engaging.

4. A set screw for insertion within a threaded set screw hole in a first member extending to a second member movable relative to said first member comprising a threaded bolt member having a smooth circular bore and turning means, a smooth stem member extending through said bore having an end portion of greater area than said bore beyond the threaded end of said bolt member having engaging means on the end thereof shaped to positively interlock with complementary shaped engaging means on said second member to positively prevent relative movement between said first and second members, one of said engaging means comprising a spline and the other of said engaging means comprising a cooperating groove, and means for locking said bolt member to said stem member against relative rotative movement with said positively interlocking means engaging.

5. A set screw for insertion within a threaded set screw hole in a first member extending to a second member movable relative to said first member comprising a threaded bolt member having a smooth circular bore and turning means, a smooth stem member extending through said bore having an end portion of greater area than said bore beyond the threaded end of said bolt member, having projecting means for positively biting into the metal of said second member to positively prevent relative movement between said first and second members, and means for locking said bolt member to said stem member against relative rotative movement with said projecting means of said stem member positively biting into said second member.

6. A set screw for insertion within a threaded set screw hole in a first member extending to a second member movable relative to said first member, comprising a threaded bolt member having a smooth circular bore and turning means, a smooth stem member extending through said bore having an end portion of greater area than said bore beyond the threaded end of said bolt member, said end portion being circular in cross section transversely of the axis at its largest diameter and having means on said end portion for non-rotatable engagement with said second member to restrain relative movement between said first and second members and means for locking said bolt member to said stem member against relative rotative movement with said means on said end portion of said stem member engaging said second member in the desired position.

7. A set screw for insertion within a threaded set screw hole in a first member extending to a second shaft member movable relative to said first member comprising a threaded bolt member having a smooth circular bore and turning means, a smooth stem member extending through said bore having an end portion of greater area than said bore beyond the threaded end of said bolt member, said end portion being circular in cross section transversely of the axis at its largest diameter and having an end having a partially cylindrical concave surface of substantially the radius of said movable second member to frictionally grip said second shaft member to prevent relative movement between said first and second members, and means for locking said bolt member to said stem member against relative rotative movement with said concave surface of said stem member non-rotatably engaging said shaft member.

8. A set screw for insertion within a threaded set screw hole in a first member extending to a second member movable relative to said first member comprising a threaded bolt member having a smooth circular bore and turning means, a smooth stem member extending through said bore having an end portion of greater area than said bore beyond the threaded end of said bolt member, said end portion being circular in cross section transversely of the axis at its largest diameter and having engaging means on the end thereof shaped to positively interlock with complementary shaped engaging means on said second member to positively prevent relative movement between said first and second members, and means for locking said bolt member to said stem member against relative rotative movement with said positively interlocking means engaging.

9. A set screw for insertion within a threaded set screw hole in a first member extending in a second member movable relative to said first member comprising a threaded bolt member having a smooth circular bore and turning means, a smooth stem member extending through said bore having an end portion of greater area than said bore beyond the threaded end of said bolt member, said end portion being circular in cross section transversely of the axis at its largest diameter and having engaging means on the end thereof shaped to positively interlock with complementary shaped engaging means on said second member to positively prevent relative movement between said first and second members, one of said engaging means comprising a spline and the other of said engaging means comprising a cooperating groove, and means for locking said bolt member to said stem member against relative rotative movement with said positively interlocking means engaging.

10. A set screw for insertion within a threaded set screw hole in a first member extending to a second member movable relative to said first member comprising a threaded bolt member having a smooth circular bore and turning means, a smooth stem member extending through said bore having an end portion of greater area than said bore beyond the threaded end of said bolt member, said end portion being circular in cross section transversely of the axis at its largest diameter and having a plurality of radial teeth on the end thereof for positively biting into the metal of said second member to positively prevent relative movement between said first and second members, and means for locking said bolt member to said stem member against relative rotative movement with said radial teeth biting into said second member.

HERBERT G. BEEDE.